United States Patent
Figelius et al.

(10) Patent No.: US 11,172,659 B2
(45) Date of Patent: Nov. 16, 2021

(54) WIRE MATERIAL CONSISTING OF A COPPER ALLOY, MESH AND BREEDING CAGE FOR AQUACULTURE

(71) Applicant: WIELAND-WERKE AG, Ulm (DE)

(72) Inventors: Benjamin Figelius, Buch (DE); Timo Allmendinger, Blaustein (DE); Daniel Steitz, Neu-Ulm (DE); Susanne Böhme, Bellenberg (DE)

(73) Assignee: WIELAND-WERKE AG, Ulm (DE)

( * ) Notice: Subject to any disclaimer, the term of this patent is extended or adjusted under 35 U.S.C. 154(b) by 64 days.

(21) Appl. No.: 16/633,394

(22) PCT Filed: Jun. 27, 2018

(86) PCT No.: PCT/EP2018/000322
§ 371 (c)(1),
(2) Date: Jan. 23, 2020

(87) PCT Pub. No.: WO2019/020208
PCT Pub. Date: Jan. 31, 2019

(65) Prior Publication Data
US 2021/0120791 A1    Apr. 29, 2021

(30) Foreign Application Priority Data
Jul. 27, 2017   (DE) ..................... 10 2017 007 138.1

(51) Int. Cl.
| A01K 75/00 | (2006.01) |
| A01K 63/00 | (2017.01) |
| B32B 15/04 | (2006.01) |
| C22C 9/04  | (2006.01) |
| C23C 8/10  | (2006.01) |
| C22F 1/08  | (2006.01) |

(52) U.S. Cl.
CPC ............. *A01K 75/00* (2013.01); *A01K 63/00* (2013.01); *B32B 15/04* (2013.01); *C22C 9/04* (2013.01); *C22F 1/08* (2013.01); *C23C 8/10* (2013.01)

(58) Field of Classification Search
None
See application file for complete search history.

(56) References Cited

U.S. PATENT DOCUMENTS

| 4,995,924 A | 2/1991 | Akutsu |
| 8,171,886 B2 | 5/2012 | Oishi |
| 9,452,467 B2 | 9/2016 | Atz et al. |
| 2005/0039827 A1 | 2/2005 | Yamagishi et al. |
| 2011/0123643 A1 | 5/2011 | Biersteker et al. |
| 2014/0170016 A1 | 6/2014 | Kaeufler et al. |

FOREIGN PATENT DOCUMENTS

| CN | 101001967 A | 7/2007 |
| CN | 103717765 A | 4/2014 |
| DE | 2746612 A1 | 4/1979 |
| DE | 3809994 A1 | 10/1988 |
| EP | 1777311 A1 | 4/2007 |
| EP | 2333125 A2 | 6/2011 |
| EP | 2664236 A1 | 11/2013 |
| JP | 10152735 A | 6/1998 |
| KR | 1020160025786 A | 3/2016 |
| WO | 2010049089 A1 | 5/2010 |
| WO | 2010094569 A1 | 8/2010 |

OTHER PUBLICATIONS

Ewen Touze, Charles Cougnon, Study of the air-formed oxide layer at the copper surface and its impact on the copper corrosion in an aggressive chloride medium, Electrochimica Acta, vol. 262, (2018), pp. 206-213 (Year: 2018).*

Japanese Office Action with English translation issued in corresponding Japanese Application No. 2019-570087, dated Mar. 23, 2021 (14 pages).

International Search Report issued in corresponding International Application No. PCT/EP2018/000322 with English translation, dated Oct. 15, 2018 (9 pages).

Written Opinion of International Searching Authority issued in corresponding International Application No. PCT/EP2018/000322 dated Oct. 15, 2018 (15 pages).

English translation of Chinese Office Action issued in corresponding Chinese Application No. 2018800465255 dated Feb. 26, 2021 (6 pages).

\* cited by examiner

*Primary Examiner* — David Sample
*Assistant Examiner* — Elizabeth Collister
(74) *Attorney, Agent, or Firm* — Flynn Thiel, P.C.

(57) ABSTRACT

The invention relates to a wire material consisting of metallic material having an oxide surface, wherein the oxide surface of the wire material has a first oxide layer, which covers the metallic material at least in part and has a thickness of at least 200 nm to 2 μm, and the oxide surface of the wire material has a second oxide layer which covers metallic material in the regions which are not covered by the first oxide layer. According to the invention, the second oxide layer has a maximum thickness of 0.01 to 10% of the thickness of the first oxide layer. The invention furthermore relates to a mesh and a breeding cage for aquaculture.

11 Claims, No Drawings

WIRE MATERIAL CONSISTING OF A COPPER ALLOY, MESH AND BREEDING CAGE FOR AQUACULTURE

BACKGROUND OF THE INVENTION

The invention relates to a wire material of metallic material having an oxide surface, a net comprising the wire material, and also a culture cage for aquaculture comprising the net.

In maritime fish farming, coated or uncoated polymer netting and metal cages are used at present. Requirements which materials used for the production of netting enclosures for aquacultures have to meet are good chemical resistance in sea water and also a high mechanical strength in order to be able to withstand short-term load peaks, for example due to impact of flotsam or attack by predators and also wave action, current and tides.

A significant further development of existing solutions occurs only when the material simultaneously meets numerous requirements. Copper-based alloys have in principle a great potential for simultaneously meeting the requirements in respect of chemical attack, fouling by microorganisms and macroorganisms (biofouling) and mechanical stressing. They have also been tested for some years in experimental facilities. Experience has already been gathered for a tin-containing special brass. This alloy is described in more detail in, for example, the document EP 1 777 311 A1. In addition, the copper-nickel alloy CuNi10Fe1Mn and silicon bronzes are employed. Alloys from the group consisting of admiralty brasses are particularly suitable for use in sea water. These are Cu—Zn alloys whose corrosion resistance in sea water is improved by addition of Sn and an element from the group consisting of As, P or Sb. Examples are the alloys C44300, C44400 and C44500.

According to the document WO 2010/049089 A1, a net or a culture cage for use in aquaculture is configured as a wire braid which can be produced from individual helical or similarly curved longitudinal elements, with the adjacent wires in each case being braided together. The longitudinal elements are produced from metal wires and consist of sea water-resistant steel which is provided with an antifouling surface. These nets are, for example, fastened to one another by shackles or the like. In addition, a net which is intended for animal farming, for example culture of fish, mussels or mollusks in bodies of water is known from the document EP 2 664 236 A1. The net is made of metal wires, ropes and/or stranded wires.

It is an object of the invention to develop a wire material for a net for a culture cage in aquaculture in respect of an improvement in the corrosion properties.

DETAILED DESCRIPTION

Preferred embodiments of the invention encompass a wire material consisting of metallic material having an oxide surface, wherein the oxide surface of the wire material has a first oxide layer which partly covers the metallic material and has a thickness of at least from 200 nm to 2 µm and the oxide surface of the wire material has a second oxide layer which covers the metallic material in the regions which are not covered by the first oxide layer. Here, the second oxide layer has a thickness of from not more than 0.01 to 10% of the thickness of the first oxide layer.

Use of different metal alloys makes particularly corrosion-resistant copper alloys suitable for use in sea water, brack water or fresh water. In the case of the wire material of the invention, particular importance is attached to the formation of the oxide surface which is based on a suitable combination of different pressing or drawing processes. Such forming operations can be hot forming processes or cold forming steps with intermediate heat treatments. The formation of the oxide surface has to be matched precisely in process engineering terms to the respective degree of deformation. Only in this way can the optimum of the expected properties of the first and second oxide layers be achieved.

The wire material is produced, for example, by means of wire drawing using a combination of an intermediate heat treatment in air in combination with a cold forming operation or a plurality of cold forming operations and intermediate heat treatments until the desired final thickness of the wire in the preferred range from 2 to 5 mm has been attained.

The metallic material can also be present in the recrystallized state which can, for example, in the case of suitable copper alloys be produced by means of a heat treatment after the last cold forming step. This state is particularly advantageous for the production of woven net structures since the forming capability of metals in the recrystallized state is particularly great.

The oxide surface consequently forms a closed surface layer on the metallic material having distinct areas of differing thickness. For use in the field of aquaculture, the release of metal into sea water, inter alia, is a primary consideration. It has been found firstly that the oxide surface causes a significantly smaller total amount of elements of the metallic material to be released into the sea water than in the case of bare surfaces. Secondly, a certain degree of mass transfer via the surface has to be made possible when using types of alloys which have antifouling properties as a result of their element content. Here, the first oxide layer has a sufficient thickness to largely suppress release of alloy elements such as copper, while the second oxide layer, which is significantly thinner than the first oxide layer, allows this mass transfer to assist the antifouling properties. In this way, the wires can, depending on the proportion by area of the first and second oxide layers be optimally adapted in respect of corrosion protection of the metallic material and the antifouling properties. In the case of a high proportion by area of the first oxide layer, corrosion protection predominates. At an increasing proportion by area of the thin second oxide layer, the antifouling properties of alloys suitable for this purpose can be improved.

A particular advantage of the solution according to the invention derives from a significant improvement in the way in which the corrosion resistance and the antifouling properties, particularly in sea water, can be balanced and optimized to meet a number of requirements. In the field of aquaculture, particular importance is attached to the release of the alloy elements into the environment when using copper materials for metal braids. The solution according to the invention can take account of this requirement in respect of a sustainable solution. Fundamentally, a reduction in the release of elements can be achieved in principle or at least over a long period of time by means of the wire material of the invention.

The hard oxide surface which is initially present on the wire material of the invention rather than being formed only under use conditions also ensures exceptionally low abrasion when used in aquaculture applications, in particular in the case of cyclic stress caused by wave action or current.

In a preferred embodiment of the invention, the first oxide layer can be arranged in segments and/or bands on the surface of the wire material. In this way, the metallic material is partly covered with an areally island-like or areally band-like oxide film which in total represents an essentially homogeneous surface in respect of a friction partner. This results in the first oxide layer having a surface which is resistant to mechanical wear when rubbed against most similar friction partners in aquaculture applications.

The proportion by area of the first oxide layer in the oxide surface of the wire material can advantageously be from 60 to 99%. Such a coverage ensures a particularly preferred proportion by area for low-wear layers.

In a further preferred embodiment of the invention, the proportion by area of the first oxide layer in the oxide surface of the wire material can be from 80 to 95%. In this way, a wear-adapted proportion by area of the first oxide layer is optimized with the thin second oxide layer in respect of a material designed for antifouling properties. In respect of the corrosion resistance and the antifouling properties in sea water, a plurality of requirements can be balanced and particularly optimized by means of these proportions by area.

The metallic material can advantageously be a copper alloy. Particularly corrosion-resistant copper alloys are suitable for use in sea water, brack water or fresh water. This is especially because such alloys are also resistant to fouling under water. Wires made of such alloys can thus serve as starting material for producing cages for use in aquacultures, which also have a higher strength compared to most conventional materials.

The copper alloy can advantageously consist of (in % by weight):
from 51.8 to 84.0% of Cu
from 15.5 to 36.0% of Zn,
from 0.35 to 3.0% of Sn,
from 0.12 to 1.5% of Fe,
from 0.02 to 1.0% of P,
optionally from 0.1 to 2.0% of Al,
optionally from 0.05 to 0.7% of Si,
optionally from 0.05 to 2.0% of Ni,
optionally from 0.1 to 1.0% of each of Mn, Co,
optionally from 0.01 to 1.0% of each of As, Sb, and unavoidable impurities.

The microstructure can consist to an extent of more than 95% of $\alpha$ mixed crystal in which at least iron phosphides and/or iron are embedded as precipitate particles.

A zinc content of from 15.5 to 32.0% in the alloy is selected, particularly according to the criterion that a readily formable, single-phase alloy is obtained. The single-phase base microstructure consists of alpha phase. In addition, the base microstructure has to be suitable for accommodating very fine precipitates of other elements. In the case of zinc contents of from 32.0 to 36.0%, a further $\beta$ phase can additionally occur to a certain extent, but this can be reduced by a heat treatment. The zinc content should not exceed 36.0% since otherwise a less favorable phase structure is established in the alloy. Especially at zinc contents above the value indicated, the brittle gamma phase, which is undesirable in this context, occurs. On the other hand, comprehensive experimental results of an alloy variant having far more than 30.0% of zinc show that the desired properties are still ensured. An important property of the alloy itself is its resistance to corrosive attack and good workability.

From a technical point of view, a higher tin content in the alloy affects the strength and corrosion resistance. On the other hand, the tin content should not exceed 3.0% since the flexibility is adversely affected thereby. In principle, the tin concentration should be kept as low as possible, but at a proportion below 0.3% no further significant influence on the alloy properties is to be expected.

Phosphides in the form of precipitate particles can be formed in Cu—Zn—Sn alloys by addition of suitable proportions of Fe and P. These phosphides are either iron phosphides or mixed phosphides, for example manganese-, nickel-, cobalt-containing phosphides. Copper phosphides can also be present. In addition, iron particles can also precipitate in the alloy matrix.

Iron is responsible for the formation of precipitate particles and thus for an improvement in the strength properties compared to conventional admiralty brasses. Precipitate formation can be controlled and optimized during the manufacturing process. In particular, precipitates are formed in this alloy during a hot forming step and the subsequent cooling. The hardening mechanisms effective in the alloy are first and foremost brought about by the element iron. The iron-containing particles present in the alloying matrix preferably have sizes in the submicron range.

Suitable optional elements also include the elements As and Sb which have a dezincing-inhibiting effect. It is also believed that As and Sb together with Fe also form compounds which could produce particle hardening in a Cu—Zn-based alloy having an $\alpha$ mixed crystal structure. Furthermore, it is believed that Co, Mn and Ni can form such compounds with P, As and Sb. A certain proportion of Al, Mn, Ni and Si can also increase the corrosion resistance of Cu-based alloys in sea water.

The introduction of alloy elements, for example copper, into sea water can at least be varied by up to a factor of 10 depending on the proportion of the surface covered by the first oxide layer and the second oxide layer.

This alloy has a high load-bearing capability in order to support the intrinsic weight when used for braids or meshes and, for example, ward off attacks by marine predators. This alloy type also has good fatigue resistance to cyclic stress caused by wave action or current.

In an advantageous embodiment of the invention, the copper alloy can have a content of from 0.7 to 1.5% of Sn and/or from 0.15 to 0.7% of Fe. A relatively low tin content within the limits indicated is therefore particularly advantageous because the flexibility of the alloy is first and foremost improved thereby. The iron content indicated is selected so that particularly fine iron-containing particles can be formed in the alloy matrix. However, these particles still have the size necessary to effect a significant improvement in the mechanical properties.

In a preferred embodiment of the invention, the copper alloy can have a content of from 0.4 to 1.2% of Al. This increases the corrosion resistance of Cu-based alloys in sea water.

In a particularly preferred embodiment, the P/Fe ratio of the copper alloy can be such that:
[P]/[Fe]>0.25. In order to ensure dezincing resistance of the alloy, it is important to select the ratio of the phosphorus content to the iron content so that it is not too low, since otherwise the entire phosphorus dissolved in the $\alpha$ mixed crystal, which acts as dezincing inhibitor, is tied up in the form of iron phosphides. In this form, its dezincing-inhibition action is not effective. It has been found in the testing for dezincing resistance that alloys in which the ratio P/Fe is such that: [P]/[Fe]>0.25 are resistant. The ratio P/Fe is more preferably such that: [P]/[Fe]>0.5.

In a further advantageous embodiment of the invention, the tensile strength $R_m$ of the metallic material can be at least 400 MPa. This results in a high load-bearing capability in order to bear the intrinsic weight of the braids or meshes and be able, for example, to ward off attacks by marine predators.

A wire produced from this alloy or another structure produced from this alloy thus has a significantly greater resistance to plastic deformation and failure by fracture.

A further aspect of the invention encompasses a net having meshes composed of the wire material according to the invention having an oxide surface.

This aspect of the invention derives from the thought that net segments, which can also be configured as elongated netting sheets, can be joined using a suitable connecting system, for example to form a cage, for aquacultures.

This opens up the possibility of producing cages having greater stability and longer life or, as an alternative, of reducing the wire diameter in order to save material. In particular, the increased strength of the above-described copper alloy is present even in the annealed state, which can be particularly advantageous for processing steps, for example the production of braids.

A further aspect of the invention encompasses a culture cage for aquaculture comprising a net having meshes composed of wire material having an oxide surface.

The invention here derives from the thought that the culture involves, in particular, fish and also crustations and mussels. For this purpose, aquaculture in which controlled culture of aquatic organisms is carried out in the sea is operated. It is usually based on netting enclosures in the sea in which, for example, salmon or other edible fish are grown.

Here, connecting elements for a net can result in loose or rigid joining of net segments. Fixing by means of rigid connecting elements serves to stiffen the seam between two net segments, as a result of which the cage is not greatly deformed at these places under the action of currents or waves.

Further working examples of the invention are explained in more detail with the aid of table 1. Cast billets composed of a copper-zinc alloy were produced by chill casting. The chemical composition of the castings is reported in table 1.

TABLE 1

Chemical composition of the alloy:

| No. | Cu [%] | Zn [%] | Sn [%] | Fe [%] | P [%] | Al [%] |
|---|---|---|---|---|---|---|
| Alloy 1 | 63.8 | Balance | 0.9 | 0.2 | 0.15 | — |
| Alloy 2 | 64.5 | Balance | 1.1 | 0.3 | 0.25 | — |
| Alloy 3 | 65.5 | Balance | 1.0 | 0.25 | 0.2 | 0.6 |

Manufacturing sequence:
Extrusion to give rods at a temperature of about 700° C.
Wire drawing by a combination of cold forming/intermediate heat treatments in air (550° C./4 h) to a final thickness of about 2.5 mm and 4 mm.

After manufacture was complete, wire material having an oxide surface was compared with corresponding wire material having a pickled surface by means of a wear test.

In the wear test, two wires were crossed over one another and the upper wire was moved back and forth in the longitudinal direction. The loss in mass resulting from this friction and the reduction in the diameter give information about the wear resistance. The pressure which the wires exert on one another can be varied. In the studies carried out, a loading of 13 N and 2000 strokes with different stressing cycles were selected as experimental parameters. The strokes were divided into 4 stressing cycles with 500 strokes in each cycle followed by a 30 minute pause in each case. The pause between the stressing cycles ensures that different corrosion behavior, i.e. the rate of formation and strength of adhesion of corrosion protection layers, is also included in the wear test.

In the wear test, the alloys 1 and 2 performed best among all the alloys over all surface configurations. The alloys having an oxide surface according to the invention displayed no measurable loss of material compared to the comparative samples in the wear test.

In addition, various experiments to determine the release of elements into sea water were carried out. The following experiments are based on: alloys 1 and 2 in the surface state bare and with oxide surface and also alloy 3 comprising aluminum in the surface state bare and with oxide surface. In the case of the alloys 1 and 2, the release of elements is decreased quite significantly by the oxide layer. Alloy 3 comprising aluminum already contains a corrosion inhibitor in the form of this element and displays low values even in the bare state. The state having an oxide surface according to the invention nevertheless makes a further contribution to the sea water resistance.

The invention claimed is:

1. A wire material for a net for a culture cage in aquaculture comprising a copper alloy as a metallic material consisting of
(in % by weight):
   from 51.8 to 84.0% of Cu,
   from 15.5 to 36.0% of Zn,
   from 0.35 to 3.0% of Sn,
   from 0.12 to 1.5% of Fe,
   from 0.02 to 1.0% of P,
   optionally from 0.1 to 2.0% of Al,
   optionally from 0.05 to 0.7% of Si,
   optionally from 0.05 to 2.0% of Ni,
   optionally from 0.1 to 1.0% of each of Mn, Co,
   optionally from 0.01 to 1.0% of each of As, Sb, and unavoidable impurities, and
   having an oxide surface,
   wherein the oxide surface of the wire material has a first oxide layer which partly covers the metallic material and has a thickness of at least from 200 nm to 2 μm,
   wherein the oxide surface of the wire material has a second oxide layer which covers the metallic material in the regions which are not covered by the first oxide layer, where the second oxide layer has a thickness of from not more than 0.01 to 10% of the thickness of the first oxide layer, and
   wherein the proportion by area of the first oxide layer in the oxide surface of the wire material is from 60 to 99%.

2. The wire material as claimed in claim 1, wherein the first oxide layer is arranged in segments and/or bands on the surface of the wire material.

3. The wire material as claimed in claim 1, wherein the proportion by area of the first oxide layer in the oxide surface of the wire material is from 80 to 95%.

4. The wire material as claimed in claim 1, wherein the content of the copper alloy includes from 0.7 to 1.5 wt. % of Sn and from 0.15 to 0.7 wt. % of Fe.

5. The wire material as claimed in claim 1, the copper alloy comprising a content of from 0.4 to 1.2 wt. % of Al.

6. The wire material as claimed in claim 1, wherein a P/Fe ratio is such that (in % by weight): [P]/[Fe]>0.25.

7. The wire material as claimed in claim 1, wherein the metallic material has a tensile strength of at least 400 MPa.

8. A net having meshes composed of wire material having an oxide surface as claimed in claim 1.

9. A culture cage for aquaculture, comprising a net having meshes composed of wire material having an oxide surface as claimed in claim 1.

10. A wire material comprising:
   an alloy consisting of:
   from 51.8% to 84.0% Cu by weight,
   from 15.5% to 36.0% Zn by weight,
   from 0.35% to 3.0% Sn by weight,
   from 0.12% to 1.5% Fe by weight,
   from 0.02% to 1.0% P by weight,
   optionally from 0.1% to 2.0% Al by weight,
   optionally from 0.05% to 0.7% Si by weight,
   optionally from 0.05% to 2.0% Ni by weight,
   optionally from 0.1% to 1.0% of each Mn and Co by weight,
   optionally from 0.01% to 1.0% of each As and Sb by weight, and
   unavoidable impurities,
   the alloy having a first surface area and a second surface area;
   a first oxide layer covering the first surface area, the first oxide layer having a thickness between 200 nm and 2 µm; and
   a second oxide layer covering the second surface area,
   wherein the first oxide layer does not cover the second surface area and the second oxide layer is between 0.01% and 10% as thick as the first oxide layer.

11. The wire material as claimed in claim 10, wherein the first oxide layer is disposed on the alloy in bands.

\* \* \* \* \*